US008171326B2

(12) United States Patent
Keller et al.

(10) Patent No.: US 8,171,326 B2
(45) Date of Patent: *May 1, 2012

(54) L1 FLUSH MECHANISM TO FLUSH CACHE FOR POWER DOWN AND HANDLE COHERENCE DURING FLUSH AND/OR AFTER POWER DOWN

(75) Inventors: James B. Keller, Redwood City, CA (US); Tse-Yu Yeh, Cupertino, CA (US); Ramesh Gunna, San Jose, CA (US); Brian J. Campbell, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 12/785,842

(22) Filed: May 24, 2010

(65) Prior Publication Data

US 2010/0235670 A1    Sep. 16, 2010

Related U.S. Application Data

(63) Continuation of application No. 11/525,584, filed on Sep. 22, 2006, now Pat. No. 7,752,474.

(51) Int. Cl.
*G06F 1/32* (2006.01)
(52) U.S. Cl. ...................................................... 713/324
(58) Field of Classification Search .................. 713/324, 713/323
See application file for complete search history.

(56) References Cited

U.S. PATENT DOCUMENTS

| 5,632,038 | A | 5/1997 | Fuller |
| 5,784,628 | A | 7/1998 | Reneris |
| 5,903,908 | A | 5/1999 | Singh et al. |
| 6,021,474 | A | 2/2000 | Milling |
| 6,125,450 | A | 9/2000 | Kardach |
| 6,571,333 | B1 | 5/2003 | Jain et al. |
| 6,760,819 | B2 | 7/2004 | Dhong et al. |
| 6,782,472 | B2 | 8/2004 | Jain et al. |
| 6,792,551 | B2 * | 9/2004 | Dai .............................. 713/320 |
| 6,976,181 | B2 * | 12/2005 | Dai et al. ...................... 713/320 |
| 7,164,610 | B2 * | 1/2007 | Kimura et al. ................ 365/195 |
| 7,325,100 | B2 | 1/2008 | Dhiman et al. |
| 7,752,474 | B2 * | 7/2010 | Keller et al. ................... 713/324 |

OTHER PUBLICATIONS

Intel, "Pentium Family User's Manual," Chapter 30, "Power Management", vol. 1: Data Book, ISBN: 1-55512-225-6, 1994, pp. 1-11.

* cited by examiner

*Primary Examiner* — Chun Cao
(74) *Attorney, Agent, or Firm* — Lawrence J. Merkel; Meyertons, Hood, Kivlin, Kowert & Goetzel, P.C.

(57) ABSTRACT

In one embodiment, a processor comprises a data cache configured to store a plurality of cache blocks and a control unit coupled to the data cache. The control unit is configured to flush the plurality of cache blocks from the data cache responsive to an indication that the processor is to transition to a low power state in which one or more clocks for the processor are inhibited.

20 Claims, 4 Drawing Sheets

L1 FLUSH MECHANISM TO FLUSH CACHE FOR POWER DOWN AND HANDLE COHERENCE DURING FLUSH AND/OR AFTER POWER DOWN

This application is a continuation of U.S. application Ser. No. 11/525,584, which was filed on Sep. 22, 2006, now U.S. Pat. No. 7,752,474.

BACKGROUND

1. Field of the Invention

This invention is related to the field of processors and, more particularly, to handling caches and cache coherency in power management modes in processors.

2. Description of the Related Art

As the power consumption of processors has increased, implementation of power management modes in processors has become increasing important. In many systems, the power supply is at least sometimes a battery or other stored-charge supply. Maximizing battery life in such systems is often a key selling feature. Additionally, even in systems that have effectively limitless power (e.g. systems plugged into a wall outlet), the challenges of cooling the processors and other circuits in the system may be reduced if the processors can be placed in low power modes when full processing power is not needed.

A variety of power management schemes are in use. Typically, the processor may be operated in one of a set of power states. The highest power state is the state in which the processor executes at its maximum operating frequency, typically supplied by the highest supply voltage used in any of the power states. In some cases, other power states are defined in which the processor operates at lower operating frequencies and/or lower supply voltages (or the lower frequencies/voltages may be used without actually causing a power state transition). Additionally, one or more lower power states are typically defined in which the processor clocks are inhibited (also referred to as disabled the clocks or "turning off" the clocks). Since the processor clocks are not toggling, logic in the processor does not change state and the power consumed by the processor may be largely reduced. In some low power states, the processor is still supplied with supply voltage to permit the state of the processor, including any caches, to be retained even though the clocks are disabled. In other low power states, the supply voltage may be deactivated as well and the processor state is lost. Typically, the processor must be reset from a low power state in which the processor's supply voltage was deactivated.

A challenge in processors that implement low power states in which the supply voltage is maintained, and thus the caches retain their state, is the maintenance of coherency in the caches with respect to any memory transactions that may be generated by other devices/processors while the processor is in the low power state. In some cases, systems "wake up" the processor to a higher power state to perform a snoop (and then return the processor to the low power state). Power is consumed in waking up the processor, often for a snoop that does not hit in the cache. In other cases, the processor is designed to continue clocking the cache and a portion of the processor that interfaces to the cache during the low power states. The cache and related circuitry is thus in a different clock domain than the rest of the processor, which complicates the overall processor design.

SUMMARY

In one embodiment, a processor comprises a data cache configured to store a plurality of cache blocks and a control unit coupled to the data cache. The control unit is configured to flush the plurality of cache blocks from the data cache responsive to an indication that the processor is to transition to a low power state in which one or more clocks for the processor are inhibited.

In another embodiment, a system comprises a processor comprising a data cache configured to store a plurality of cache blocks and a secondary cache coupled to the processor. The processor is configured to flush the plurality of cache blocks from the data cache responsive to an indication that the processor is to transition to a low power state in which one or more clocks for the processor are inhibited. The flush comprises writing any modified cache blocks of the plurality of cache blocks to the secondary cache.

In yet another embodiment, a method comprises determining that a processor is to transition to a low power state in which one or more clocks used by the processor are inhibited; and flushing a plurality of cache blocks from a data cache within the processor responsive to determining that the processor is to transition to the low power state.

BRIEF DESCRIPTION OF THE DRAWINGS

The following detailed description makes reference to the accompanying drawings, which are now briefly described.

Figure 1:
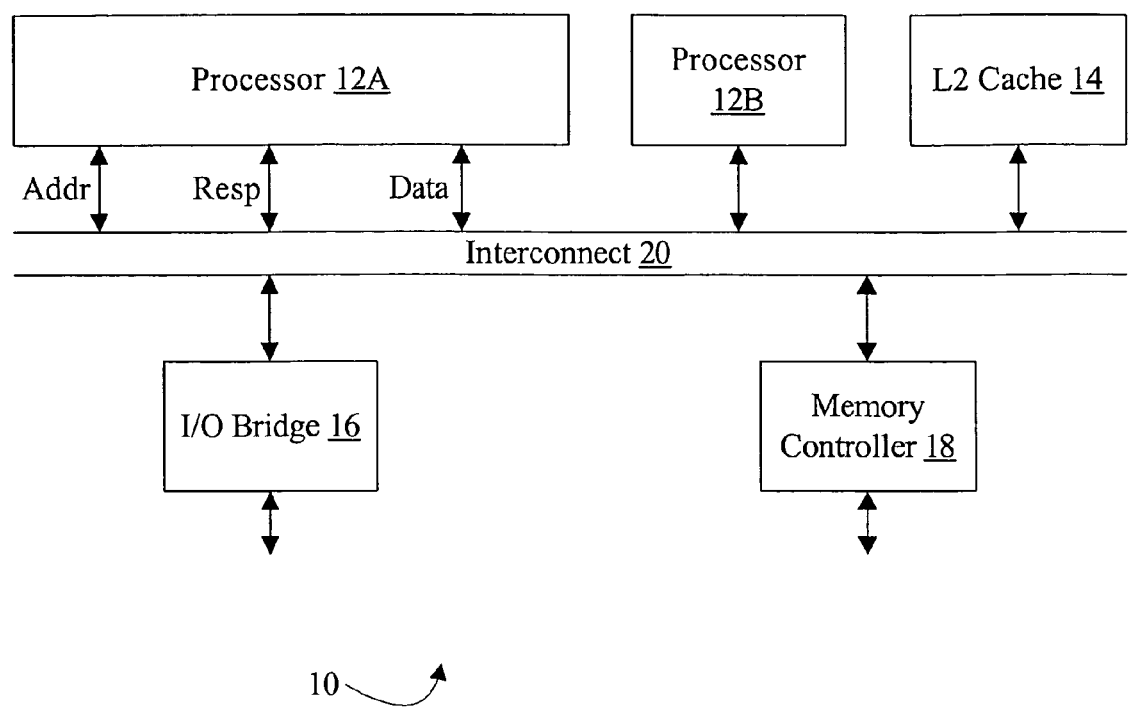
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

System Overview

Turning now to FIG. 1, a block diagram of one embodiment of a system 10 is shown. In the illustrated embodiment, the system 10 includes processors 12A-12B, a level 2 (L2) cache 14, an I/O bridge 16, a memory controller 18, and an interconnect 20. The processors 12A-12B, the L2 cache 14, the I/O bridge 16, and the memory controller 18 are coupled to the interconnect 20. More particularly, as illustrated with regard to the processor 12A, the agent coupled to the interconnect 20 may communicate via transactions having address, response, and data phases on the interconnect 20. While the illustrated embodiment includes two processors 12A-12B, other embodiments of the system 10 may include one processor or more than two processors. Similarly, other embodiments may include more than one L2 cache 14, more than one I/O bridge 16, and/or more than one memory controller 18. In one embodiment, the system 10 may be integrated onto a single integrated circuit chip (e.g. a system on a chip configuration). In other embodiments, the system 10 may comprise two or more integrated circuit components coupled together via a circuit board. Any level of integration may be implemented in various embodiments.

In the illustrated embodiment, cache coherent communication is supported on the interconnect 20 via the address, response, and data phases of transactions on the interconnect 20. Generally, a transaction is initiated by transmitting the address of the transaction in an address phase, along with a command indicating which transaction is being initiated and various other control information. Cache coherent agents on the interconnect 20 use the response phase to maintain cache coherency. Each coherent agent responds with an indication of the state of the cache block addressed by the address, and may also retry transactions for which a coherent response cannot be determined or for other reasons. Retried transactions are cancelled, and may be reattempted later by the initiating agent. The order of successful (non-retried) address phases on the interconnect 20 may establish the order of transactions for coherency purposes. The data for a transaction is transmitted in the data phase. Some transactions may not include a data phase. For example, some transactions may be used solely to establish a change in the coherency state of a cached block. Generally, the coherency state for a cache block may define the permissible operations that the caching agent may perform on the cache block (e.g. reads, writes, etc.). Common coherency state schemes include the modified, exclusive, shared, invalid (MESI) scheme, the MOESI scheme which includes an owned state in addition to the MESI states, and variations on these schemes. Generally, a cache block may refer to a contiguous block of data which is the unit of allocation and deallocation in the caches within the system. The cache blocks may be aligned to cache block boundaries in the memory system.

In some embodiments, coherency is maintained by the agents on the interconnect 20 snooping transactions and checking for cached copies of the transactions.

In other embodiments, coherency may be maintained through the transmission of explicit probe commands on the interconnect 20, to which targeted agents respond based on their cache state. In either case, the maintenance of coherency may involve responding to external communication and possibly changing cache state responsive to the external communication. Snooping will be used as an example below, but explicit probes may be used in other embodiments.

The interconnect 20 may have any structure. For example, the interconnect 20 may have separate address, response, and data interfaces to permit split transactions on the interconnect 20. The interconnect 20 may support separate address and data arbitration among the agents, permitting data phases of transactions to occur out of order with respect to the corresponding address phases. Other embodiments may have in-order data phases with respect to the corresponding address phase. In one implementation, the address phase may comprise an address packet that includes the address, command, and other control information. The address packet may be transmitted in one bus clock cycle, in one embodiment. In one particular implementation, the address interconnect may include a centralized arbiter/address switch to which each source agent (e.g. processors 12A-12B, L2 cache 14, and I/O bridge 16) may transmit address requests. The arbiter/address switch may arbitrate among the requests and drive the request from the arbitration winner onto the address interconnect. In one implementation, the data interconnect may comprise a limited crossbar in which data bus segments are selectively coupled to drive the data from data source to data sink.

The processors 12A-12B may comprise circuitry implementing an instruction set architecture. That is, the processors 12A-12B may include circuitry that executes the instructions defined in the instruction set architecture. In one embodiment, the processors 12A-12B implement the PowerPC™ instruction set architecture. However, other embodiments may implement any instruction set architecture (e.g. MIPS™, SPARC™, x86 (also known as Intel Architecture-32, or IA-32), IA-64, ARM™, etc.).

The processors 12A-12B may each include a data cache, and may also be configured to enter a low power state in which one or more clocks used by the processor are inhibited. When a processor 12A-12B is to transition to the low power state, the processor 12A-12B may be configured to flush the data cache. Flushing the data cache may include writing any cache blocks that have been modified by the processor in the cache (and thus the copy in the memory system and/or the L2 cache 14, if any, is not the most recent copy) out of the processor. Flushing may also include invalidating the cache blocks in the cache, in some embodiments. In other embodiments, the cache block states may be changed to another state, such as shared, as described in more detail below.

Since the modified cache blocks have been written out of the processor 12A-12B, the processor 12A-12B need not be able to supply data for any memory transactions that may subsequently occur while the processor is in the low power state. Furthermore, if the cache blocks are invalidated or changed to a state that is known externally (e.g. by the L2 cache 14), the processor 12A-12B need not respond to snoops (or probes) at all. Accordingly, the clocks to the processor may be disabled, including the clocks to the data cache and corresponding snoop circuitry. For example, in one embodiment, the processors 12A-12B may implement a duplicate set of cache tags for coherency purposes (referred to as "snoop tags"). The snoop tags may be disabled along with the rest of the processor 12A-12B. Accordingly, the processor 12A-12B need not have separate clock domains to keep the coherency maintenance circuitry/data cache active in the low power state, in some embodiments, although a processor 12A-12B may implement multiple clock domains for other reasons. Furthermore, the processor 12A-12B need not be woken up from the low power state to respond to a snoop, in some embodiments.

In some embodiments, the low power state may also include deactivating the power supply. Since the modified cache blocks have been written back to the L2 cache 14 or other memory external to the processor 12A-12B, no data is lost from the data cache when the power supply is deactivated.

The L2 cache 14 may be an external level 2 cache, where the data and instruction caches in the processors 12A-12B are level 1 (L1) caches. In one implementation, the L2 cache 14 may be a victim cache for cache blocks evicted from the L1 caches. The L2 cache 14 may have any construction (e.g. direct mapped, set associative, etc.).

The modified cache blocks flushed from the processors 12A-12B when entering a low power state may be written to the L2 cache 14, in one embodiment. Accordingly, the latency to reload the flushed blocks into the data cache of the processors 12A-12B after returning to a high power state may be the latency of an L2 cache hit, assuming the blocks remain stored in the L2 cache 14 at the time the processors 12A-12B wake up. Additionally, in embodiments that implement the system 10 as a system on a chip, writing the modified cache blocks to the L2 cache 14 may consume less power than writing the blocks to the external (off chip) memory.

A low power state may refer to any state that the processor 12A-12B may enter that is designed to consume less power than the normal state of executing at full speed in the processor. Such states may be referred to as sleep states, and the term sleep state will be used as an example herein. Other terms used for low power states include nap, deep sleep, power down, etc.

The I/O bridge 16 may be a bridge to various I/O devices or interfaces (not shown in FIG. 1). Generally, the I/O bridge 16 may be configured to receive transactions from the I/O devices or interfaces and to generate corresponding transactions on the interconnect 20. Similarly, the I/O bridge 16 may receive transactions on the interconnect 20 that are to be delivered to the I/O devices or interfaces, and may generate corresponding transactions to the I/O device/interface. In some embodiments, the I/O bridge 16 may also include direct memory access (DMA) functionality.

The memory controller 18 may be configured to manage a main memory system (not shown in FIG. 1). The memory in the main memory system may comprise any desired type of memory. For example, various types of dynamic random access memory (DRAM) such as synchronous DRAM (SDRAM), double data rate (DDR) SDRAM, etc. may form the main memory system. The processors 12A-12B may generally fetch instructions from the main memory system, and may operate on data stored in the main memory system. I/O devices may use the main memory system to communicate with the processors 12A-12B (e.g. via DMA operations or individual read/write transactions).

Processor

Figure 2:
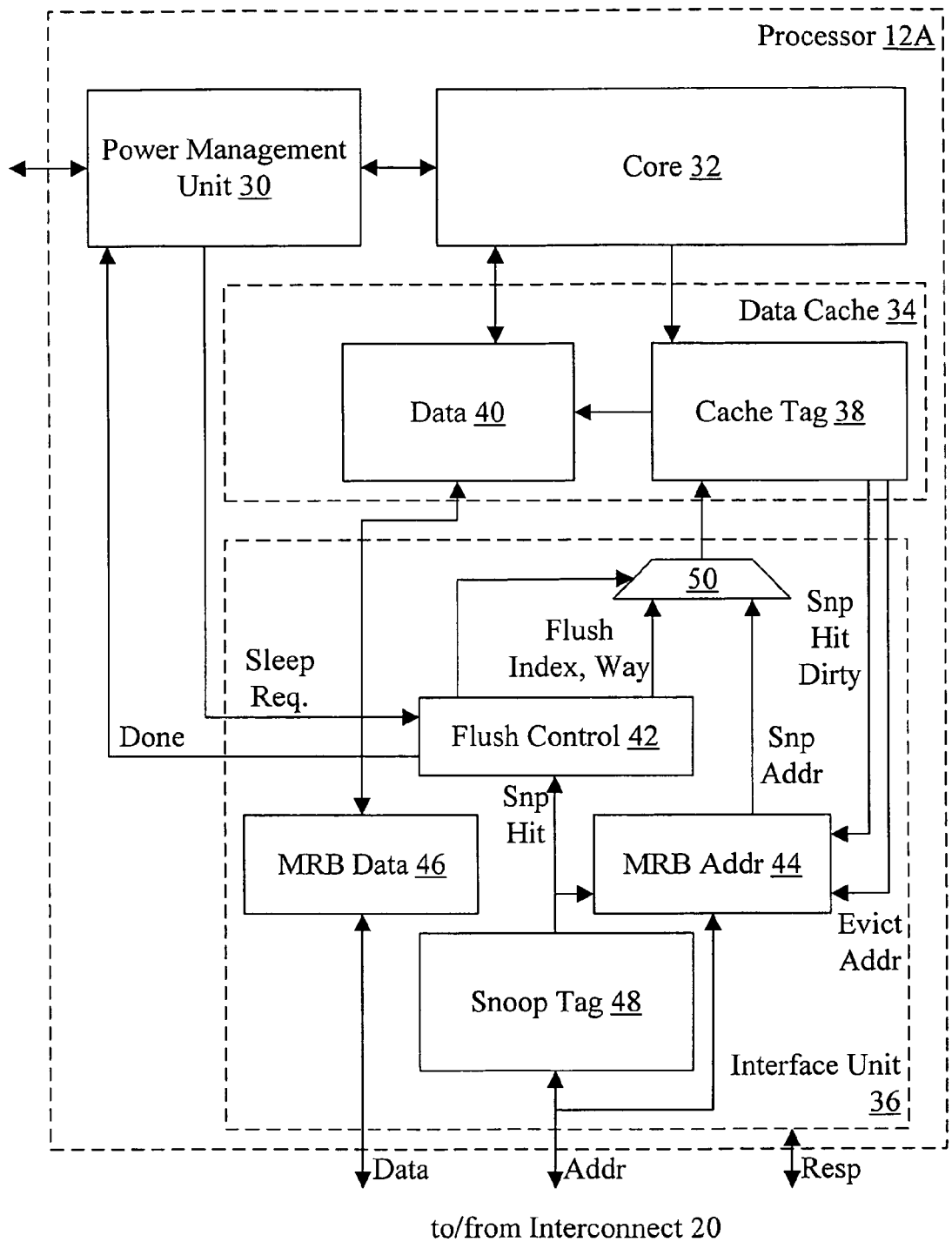
FIG. 2 is a block diagram of one embodiment of a processor shown in FIG. 1.

Turning next to FIG. 2, a block diagram of one embodiment of the processor 12A is shown. The processor 12B may be similar. In the embodiment of FIG. 2, the processor 12A includes a power management unit 30, a core 32, a data cache 34, and an interface unit 36. The power management unit 30 is coupled to one or more external signals received by the processor 12A, and is coupled to the core 32 and the interface unit 36. The core 32 is coupled to the data cache 34, which is coupled to the interface unit 36. The data cache 34 comprises a cache tag memory 38 and a data memory 40. The interface unit 36 comprises a flush control unit 42, a memory request buffer (MRB) address buffer 44, an MRB data buffer 46, a snoop tag 48, and a multiplexor (mux) 50. In the illustrated embodiment, the power management unit 30 is configured to transmit a sleep request signal (sleep req.) to the flush control unit 42 and to receive a done signal from the flush control unit 42. The core 32 is configured to transmit memory requests to the data cache 34 (and more particularly to the cache tag memory 38). The cache tag memory 38 is coupled to the data memory 40, which is coupled to provide/receive data (in the event of a hit in the data cache 34) to/from the core 32. The cache tag memory 38 is further coupled to receive snoop addresses (and flush address info) from the mux 50 and to provide a snoop hit dirty indication and evict address to the MRB address buffer 44. The mux 50 has an input coupled to the MRB address buffer 44 to receive a snoop address, and an input from the flush control unit 42 to receive a flush index and way. The mux select control is provided by the flush control unit 42. The MRB data buffer 46 is coupled to receive and provide data from/to the data memory 40 and to receive and provide data on the data portion of the interconnect 20. The snoop tag 48 is coupled to receive an address from the address portion of the interconnect 20, and the MRB address buffer 44 is coupled to receive and transmit addresses on the address portion. The snoop tag 48 is further coupled to provide a snoop hit signal to the flush control unit 42 and to the MRB address buffer 44. The interface unit 36 is further coupled to receive and provide snoop responses on the response portion of the interconnect 20.

The data cache 34, in the illustrated embodiment, includes the cache tag memory 38 and the data memory 40. The data cache 34 may comprise a plurality of cache block storage locations, where each cache block storage location is configured to store a cache block. In the illustrated embodiment, each cache block storage location comprises a memory location in the cache tags memory 38 and a memory location in the data memory 40. The cache tags memory 38 stores a tag locating the corresponding cache block in memory. The tag may generally include a portion of the address that excludes the cache offset portion and the portion used to index the data cache 34, in set associative or direct mapped embodiments. The cache tags memory 38 may also store the cache coherency state (e.g. MESI state or MOESI state, in some embodiments), validity of the cache block, replacement data such as least recently used (LRU) state, etc. The data memory 40 may store the cache block of data. The cache tags memory 38 may detect a hit or miss in response to a cache access, and may provide controls to the cache data memory 40 to read/write the appropriate data memory location.

The core 32 generally includes the circuitry that implements instruction processing in the processor 12A, according to the instruction set architecture implemented by the processor 12A. That is, the core 32 may include the circuitry that fetches, decodes, executes, and writes results of the instructions in the instruction set. The core 32 may generate read and write cache accesses to the data cache 34 (e.g. in response to executing load/store operations defined in the instruction set architecture). In the event of a cache hit, the data cache 34 may update with data from the core 32 (for a write) or provide data to the core 32 (for a read). In the event of a cache miss, a fill request for the data cache 34 may be queued in the MRB address buffer 44, and the missing cache block may be filled to the data cache 34. When the missing cache block is filled into the data cache 34, another cache block may be evicted from the data cache 34. The data cache 34 may provide the evict address (shown as Evict Addr in FIG. 2) to the MRB address buffer 44. The same path may be used for miss addresses and for cache blocks being written back in response to a snoop, in some embodiments. The data cache 34 may also provide the evict data to the MRB data buffer 46 from the data memory 40.

For snoop operations from the interconnect 20, the snoop tag 48 may be checked to determine if a snoop hit on a cache block stored in the data cache 34 is detected. That is, the snoop tags 48 may be duplicate cache tags for the cache tag memory 38, used for snooping purposes. If no snoop hit is detected, the interface unit 36 may generate an appropriate response for the snooped transaction. If a snoop hit is detected, the interface unit 36 may generate the response and the MRB address buffer 44 may queue the snoop address (responsive to the snoop hit signal from the snoop tag 48). The flush control unit 42 may also receive the snoop hit signal, as described in more detail below. The MRB address buffer 44 may subsequently transmit the snoop address (or the index and way of the cache storage location that is hit by the snoop, as determined from the snoop tag 48). If the snoop hits a dirty (modified) cache block in the data cache 34, the cache tag memory 38 may assert the snoop hit dirty signal (Snp Hit Dirty in FIG. 2) to the MRB address buffer 44 and may direct the data memory 40 to output the modified cache block to the MRB data buffer 46. It is noted that, while the snoop address input to the data cache 34 (through the mux 50) is illustrated separately from the input of the core 32 to the cache tags memory 38, the snoop and core accesses may share a port on the data cache 34/cache tag memory 38, in some embodiments.

The flush control unit 42 may share the path to the data cache 34 with the snoop address from the MRB address buffer 44, through the mux 50 in the illustrated embodiment. Generally, the power management unit 30 may detect that a transition to sleep state is desired (e.g. from external inputs to the power management unit 30, through internal monitoring by the power management unit 30, or a combination of external input and internal monitoring, in various embodiments). If a transition to sleep state is desired, the power management unit 30 may communicate with the core 32 to cause the core 32 to quiesce instruction execution and may also communicate with the flush control unit 42 to indicate that the transition to sleep state is to occur. For example, in the illustrated embodiment, the power management unit 30 may assert the sleep request signal to the flush control unit 42.

Responsive to the assertion of the sleep request signal, the flush control unit 42 may flush the data cache 34 of the cache blocks stored therein. More particularly, the flush control unit 42 may generate a plurality of requests to the data cache 34. Each request may access a different cache block storage location in the data cache 34 and may cause a flush of the cache block stored therein, if any. The data cache 34 may respond, for cache block storage locations that store modified cache blocks, by asserting the snoop hit dirty signal and providing the address of the modified cache block as the evict address to the MRB address buffer 44. The cache block data may be provided to the MRB data buffer 46 from the data memory 40 as well. The data cache 34 may also invalidate the cache block in the data cache, updating the cache tag memory 38. Thus, the flush requests may operate similar to a snoop invalidate in the data cache 34 and similar to an evict for the MRB buffers 44 and 46. Once the data cache 34 has been flushed, the flush control unit 42 may signal done to the power management unit 30. The power management unit 30 may permit the transition to sleep state responsive to the done signal assertion and responsive to the core 32 having quiesced.

In one embodiment, the data cache 34 has a set associative structure. In such an embodiment, each request generated by the flush control unit 42 may comprise the index and way of the cache block storage location to be accessed. In a direct mapped embodiment, only the index may be included in the request.

During flush operation, the flush control unit 42 may generate the mux select to the mux 50 to select the flush index and way generated by the flush control unit 42. If flush operation is not in progress, the flush control unit 42 may select the snoop address input to the mux 50 from the MRB address buffer 44. The flush control unit 42 may also be configured to interrupt flush operation to permit a snoop hit to be serviced in the data cache 34 (responsive to the snoop hit signal from the snoop tag 48, in the illustrated embodiment). The flush control unit 42 may select the snoop address from the MRB address buffer 44 for one access (e.g. one clock cycle) in response to the snoop hit. The selection of the snoop address may be delayed from the assertion of the snoop hit by one or more clock cycles to permit the snoop address to be written to the MRB address buffer 44 and to be available on the snoop address input to the mux 50. It is noted that the mux 50 merely illustrates the path sharing between the flush index and way and the snoop address. Other embodiments may implement the path sharing in any desired fashion.

In the present embodiment, flushing of the data cache 34 includes writing modified cache blocks out of the processor 12A (e.g. to the L2 cache 14) and invalidating the cache blocks in the data cache 34. Other embodiments may implement flushing in other ways. For example, in one embodiment, each valid cache block may be changed to shared state in the data cache 34. In such an embodiment, the only snoops that may require service in the data cache 34 may be snoops that cause invalidation. The processor 12A may transition to a higher power state if such a snoop occurs. Alternatively, the L2 cache 14 or other external circuitry may be configured to queue one or more invalidating snoops for presentation to the processor 12A upon transition to the higher power state, and the processor 12A may be transitioned to the higher power state temporarily if the queue fills. In yet another alternative, the L2 cache 14 may be configured to tag cache blocks that were flushed from the data cache 34 but retained in shared state and may detect snoop invalidations to such cache blocks for queuing or to transition to the processor 12A to a higher power state for servicing the snoop. In still another alternative, the L2 cache 14 or other external circuitry may detect a snoop invalidate (or a snoop hit invalidate) and may cause the entire data cache 34 to be invalidated when the processor 12A transitions to a higher power state.

It is noted that the snoop tag 48 may provide a filter for snoops, determining which snoops are to be provided to the data cache 34 for state changes and/or to write out modified cache blocks. Other embodiments may not implement the snoop tag 48, and may snoop the data cache 34 for each snooped transaction (or probe). In such an embodiment, the flush control unit 42 may receive a snoop received signal instead of the snoop hit signal, and may interrupt flushing to permit the snoop.

The interface unit 36 may further include the circuitry (not shown in FIG. 2) for interfacing between the processor 12A components and other components coupled to the interconnect 20, such as the processor 12B, the L2 cache 14, the I/O bridge 16, and the memory controller 18. While the embodiment of the interface unit 36 in FIG. 2 implements separate address and data buffers for the MRB, other embodiments may implement a combined buffer. Additionally, a separate snoop address and data buffer may be used, in some embodiments. Generally, a buffer such as the MRB may comprise any memory structure that is logically viewed as a plurality of entries. In the case of the MRB, each entry may store the information for one transaction to be performed on the interconnect 20 or snooped from the interconnect 20. In some cases, the memory structure may comprise multiple memory arrays (e.g. the address buffer 44 and the data buffer 46). Additionally, the memory structure may comprise clocked storage devices such as flops, latches, registers, etc. Any combination of one or more memory arrays and/or one or more clocked storage devices may be used.

It is noted that, while the illustrated embodiment shows the flush control unit 42 as part of the interface unit 36, other embodiments may implement the flush control unit 42 as part of the data cache 34 or between the data cache 34 and the interface unit 36.

Figure 3:
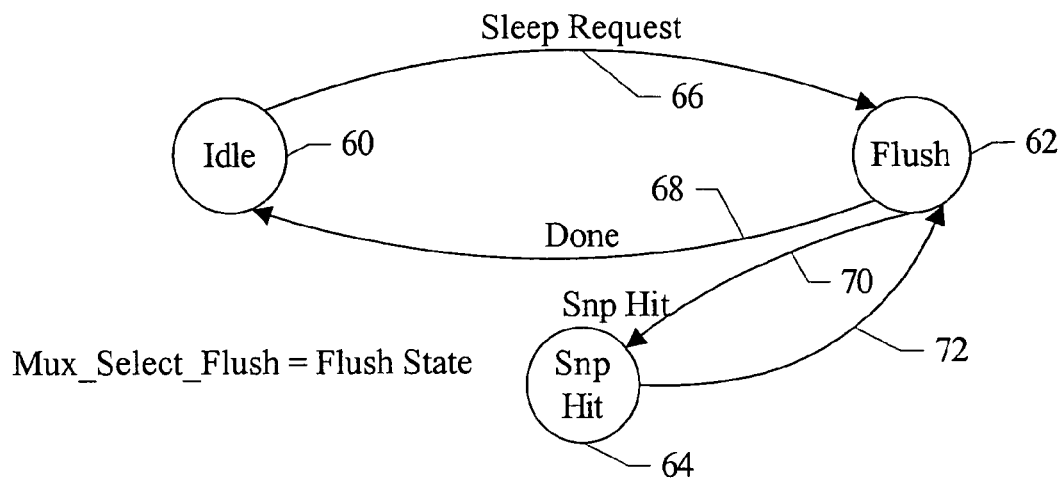
FIG. 3 is a block diagram of one embodiment of a state machine for flushing the data cache shown in FIG. 2.

Turning now to FIG. 3, a block diagram of one embodiment of a state machine that may be implemented by one embodiment of the flush control unit 42 is shown. In the illustrated embodiment, the state machine includes an idle state 60, a flush state 62, and a snoop hit (snp hit) state 64.

In the idle state 60, no flush is in progress. The state machine remains in the idle state until a sleep request is indicated by the power management unit 30 (arc 66), in which case a transition to the flush state 62 occurs. In the flush state 62, a flush is in progress and the flush control unit 42 generates flush requests to the data cache 34. The state machine remains in the flush state 62 until either the flush is complete and done is signalled, in which case a transition to the idle state 60 occurs (arc 68), or until a snoop hit is signalled to the flush control unit 42, in which case a transition to the snoop hit state 64 occurs (arc 70). From the snoop hit state 64, a transition automatically occurs back to the flush state 62 (arc 72), thus creating a one-request window for the snoop hit to be serviced in the data cache 34.

In the flush state 62, the flush control unit 42 is generating flush requests. In the idle state 60, no flush is in progress and in the snoop hit state 64, the flush control unit 42 is stalling to permit a snoop hit to be serviced. Accordingly, the mux select for the mux 50 may be generated to select the flush input to the mux 50 if the state machine is in the flush state 62 and to select the snoop hit input to the mux 50 otherwise. This is illustrated as the Mux_Select_Flush equation in FIG. 3, where the Mux_Select_Flush signal equaling binary one selects the flush input and equaling binary zero selects the snoop hit input.

Figure 4:
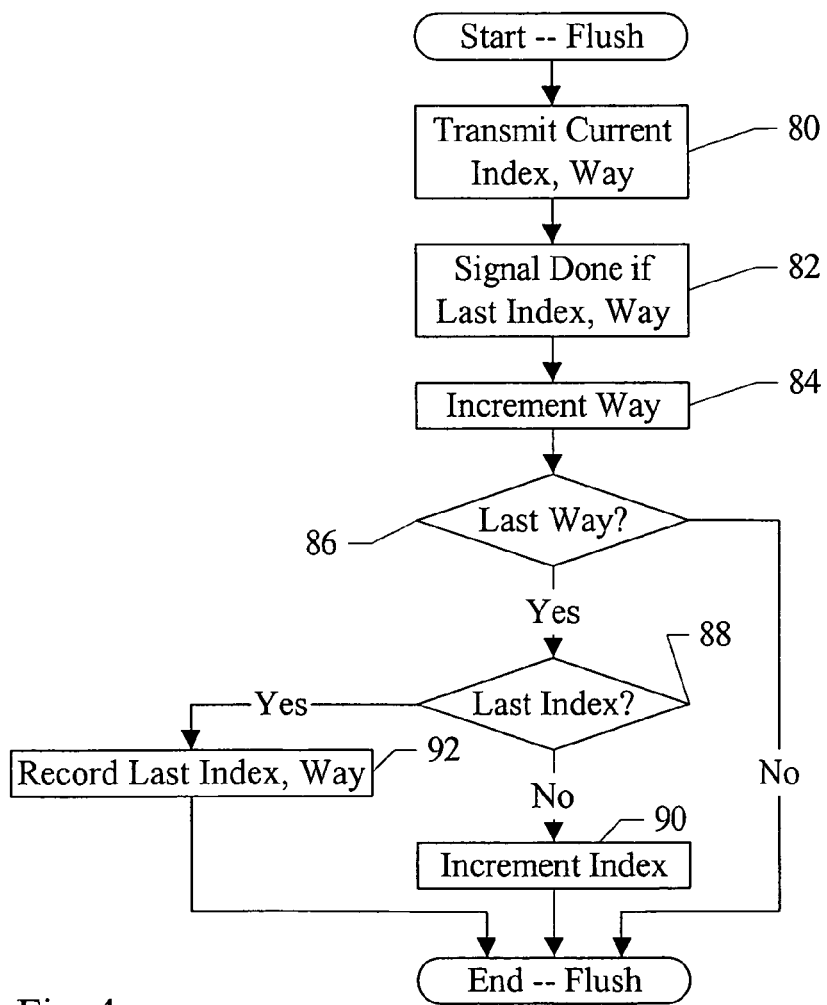
FIG. 4 is a flowchart illustrating operation in one of the states shown in FIG. 3 for one embodiment.

Turning now to FIG. 4, a flowchart is shown illustrating one clock cycle of operation in one embodiment of the flush control unit 42 if the state machine is in the flush state 62. The flowchart of FIG. 4 may be repeated each clock cycle that the state machine is in the flush state 62. While the blocks are shown in a particular order in FIG. 4 for ease of understanding, any order may be used. Furthermore, blocks may be performed in parallel in combinatorial logic within the flush control unit 42. Upon transition from the idle state 60 to the flush state 62, the current way and index may be initialized to zero in this embodiment.

The flush control unit 42 may transmit the current index and way as the flush index and way to the mux 50 (block 80). If the current index and way are the last index and way of the flush operation, the flush control unit 42 may signal done to the power management unit 30 (and the state machine may transition to the idle state 60) (block 82). The flush control unit 42 may increment the current way to generate the way for the next request (block 84). If the current way is the last way of the set (decision block 86, "yes" leg) and the current index is not the last index of the indexes to the data cache 34 (decision block 88, "no" leg), the flush control unit 42 may increment the current index to generate the index for the next request (block 90). If the current way is the last way of the set (decision block 86, "yes" leg) and the current index is the last index of the indexes to the data cache 34 (decision block 88, "yes" leg), the flush control unit 42 may record an indication that the last index and way are being transmitted so that the flush control unit 42 may signal done when transmitting the last index and way to the data cache 34 (block 92). Alternatively, signalling of done may be delayed until the last index and way have been transmitted and the last modified cache blocks are in the MRB (or have been written out of the processor 12A).

The embodiment illustrated in FIG. 4 increments through the ways of a given index before moving to the next index. Other embodiments may increment through the possible indexes in a given way before moving to the next way. Still other embodiments may start with the last index and way and decrement to zero. Any mechanism that generates each index and way or otherwise flushes each cache block from the data cache 34 may be used.

Figure 5:
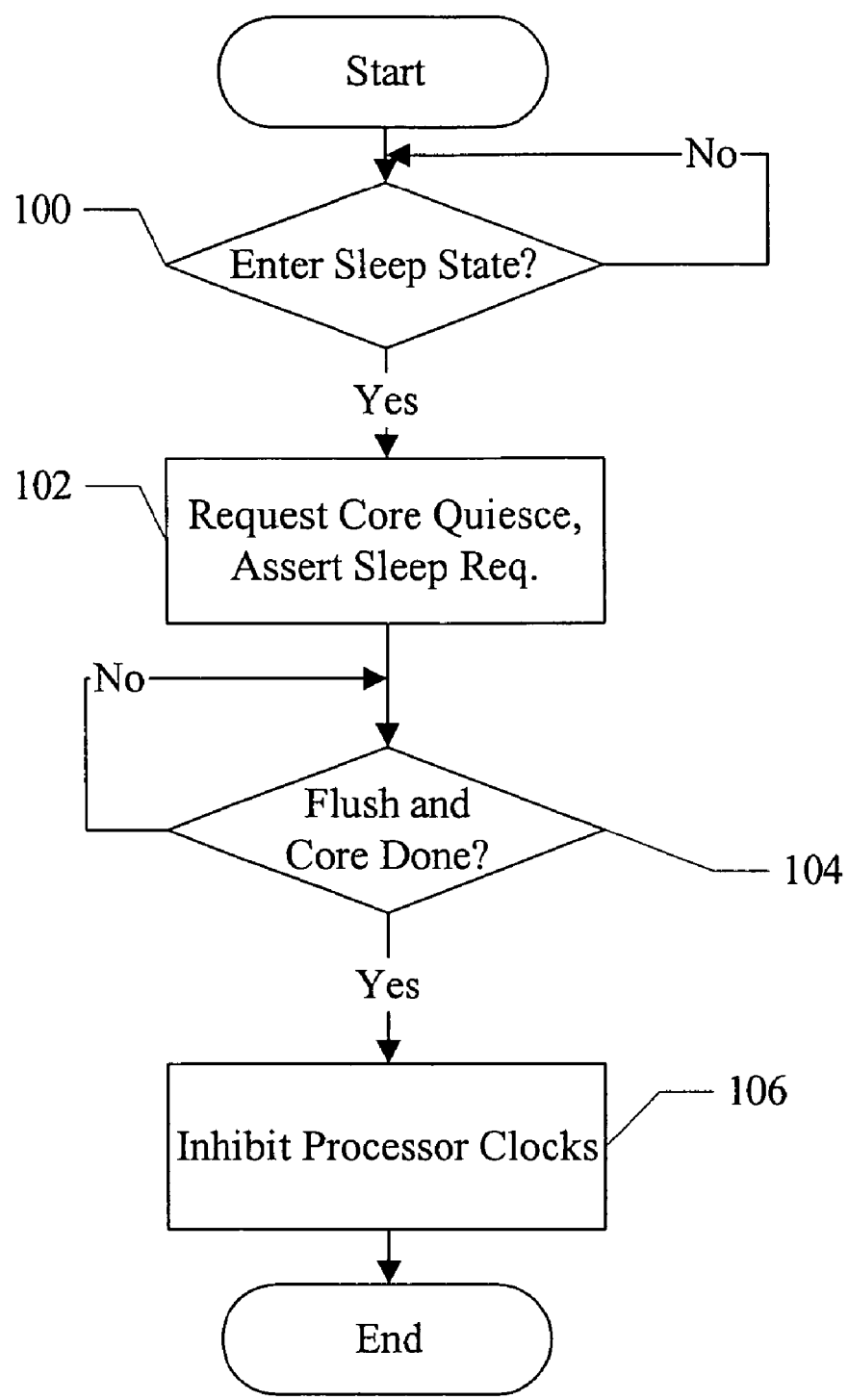
FIG. 5 is a flowchart illustrating operation of one embodiment of the processor in transitioning to a low power state.

Turning now to FIG. 5, a flowchart illustrating operation of one embodiment of the power management unit 30 is shown. While the blocks are shown in a particular order in FIG. 5 for ease of understanding, any order may be used. Furthermore, blocks may be performed in parallel in combinatorial logic within the power management unit 30. Blocks, combinations of blocks, and/or the flowchart as a whole may be pipelined over multiple clock cycles.

The power management unit 30 may determine whether or not a transition to the sleep state is desired (decision block 100). As mentioned previously, the power management unit 30 may determine whether or not a transition to sleep state is desired by monitoring one or more external signals to the processor 12A, monitoring internal operation of the processor 12A (e.g. instruction execution in the core 32), or any combination thereof. If no transition is desired (decision block 100, "no" leg), the power management unit 30 may continue monitoring the external signals and/or the internal operation.

If a transition is desired (decision block 100, "yes" leg), the power management unit 30 may request that the core 32 quiesce (that is, to cease instruction execution in a consistent state that permits continued execution upon wake up from the sleep state) and may assert the sleep request signal to the flush control unit 42 (block 102). In some embodiments, quiescing the core 32 and flushing the data cache 34 may be performed in parallel. In other embodiments, the core 32 may first be quiesced, and then flushing of the data cache 34 may be performed.

The power management unit 30 may wait for the core 32 to be quiesced and for the flush to be complete (decision block 104). Responsive to both the core 32 being quiesced and the flush being completed (decision block 104, "yes" leg), the power management unit 30 may inhibit the processor clocks (or may permit external circuitry to inhibit processor clocks, in other embodiments) (block 106).

Numerous variations and modifications will become apparent to those skilled in the art once the above disclosure is fully appreciated. It is intended that the following claims be interpreted to embrace all such variations and modifications.

What is claimed is:

1. A processor comprising:
   a data cache configured to store a plurality of cache blocks; and
   a control unit coupled to receive an indication that the processor is to transition to a low power state, wherein the control unit is coupled to the data cache and is configured to flush the plurality of cache blocks from the data cache responsive to the indication that the processor is to transition to the low power state, and wherein the control unit is configured to interrupt the flush to permit coherence operation processing in the data cache, wherein the coherence operation is used to maintain cache coherence in the data cache.

2. The processor as recited in claim 1 wherein the coherence operation is a snoop.

3. The processor as recited in claim 1 wherein the coherence operation is a probe.

4. The processor as recited in claim 1 wherein the data cache comprises a cache tag memory configured to store a plurality of cache tags corresponding to the plurality of cache blocks, and wherein the processor further comprises a second tag memory dedicated to coherence processing, and wherein the coherence operation is checked in the second tag memory for a hit, and wherein the control unit is configured to interrupt the flush to permit the coherence operation processing responsive to the hit.

5. A system comprising:
   a processor comprising a data cache configured to store a plurality of cache blocks; and
   a secondary cache coupled to the processor;
   wherein the processor is configured to flush the plurality of cache blocks from the data cache responsive to an indication that the processor is to transition to a low power state in which one or more clocks for the processor are inhibited, and wherein the processor is configured to insert a coherence operation to be processed by the data cache during the flush of the data cache and to interrupt the flush to insert the coherence operation, wherein the coherence operation is used to maintain cache coherence in the data cache, and wherein the flush comprises writing any modified cache blocks of the plurality of cache blocks to the secondary cache.

6. The system as recited in claim 5 wherein the data cache comprises a cache tag memory configured to store a plurality of cache tags corresponding to the plurality of cache blocks, and wherein the processor further comprises a second tag memory dedicated to coherence processing, and wherein coherence operations received by the processor are filtered through the second tag memory, and wherein coherence operations that hit in the second set of tags are processed in the data cache.

7. The system as recited in claim 5 wherein the plurality of cache blocks remain stored in the cache subsequent to the flushing.

8. The system as recited in claim 7 wherein a coherence state of each of the plurality of cache blocks stored in the cache at a completion of the flush is a shared state.

9. The system as recited in claim 5 further comprising a power management unit configured to generate the indication.

10. A method comprising:
   detecting that a processor is to enter a low power state;
   flushing a plurality of cache blocks stored in a data cache of the processor;
   during the flushing, detecting a snoop operation to be serviced by the data cache;
   interrupting the flushing to service the snoop operation responsive to detecting the snoop operation; and
   resuming the flushing subsequent to servicing the snoop operation.

11. The method as recited in claim 10 wherein detecting the snoop operation to be serviced comprises detecting a hit in a snoop tags memory that is separate from the data cache, wherein a miss in the snoop tags for a second snoop operation indicates that the second snoop operation is not to be serviced in the data cache.

12. The method as recited in claim 10 further comprising entering the low power state responsive to completing the flushing.

13. The method as recited in claim 10 wherein flushing the plurality of cache blocks comprises writing modified cache blocks to a memory external to the processor.

14. The method as recited in claim 13 wherein flushing the plurality of cache blocks further comprises invalidating the plurality of cache blocks in the data cache.

15. The method as recited in claim 13 wherein flushing the plurality of cache blocks further comprises changing a state of the plurality of cache blocks to the shared state.

16. A processor comprising:
   a data cache;
   control circuitry configured to cause the data cache to write any modified cache blocks from the data cache and further configured to cause the data cache to change a state of any cache blocks in the cache to a shared state, the control circuitry configured to cause the data cache to write the modified cache blocks and to change the state responsive to a power management unit request for the processor to enter a sleep state;
   wherein the processor is configured to respond to a snoop invalidate operation during the sleep state by invalidating at least one cache block in the data cache subsequent to waking up from the sleep state.

17. The processor as recited in claim 16 wherein the wakeup from the sleep state is temporary to process one or more snoop invalidates.

18. The processor as recited in claim 16 wherein the wakeup from the sleep state is to begin processing instructions in the processor.

19. The processor as recited in claim 16 wherein the processor is configured to queue a plurality of snoop invalidate operations that hit in the cache to be invalidated in response to the processor waking up from the sleep state.

20. The processor as recited in claim 16 wherein the processor is configured to cause the data cache to invalidate any cache blocks stored in the data cache in response to the snoop invalidate during the sleep state.

* * * * *